US012573802B2

(12) United States Patent
Salehiomran

(10) Patent No.: US 12,573,802 B2
(45) Date of Patent: Mar. 10, 2026

(54) FULL-BAND, HIGH-POWER OPTICAL AMPLIFIER

(71) Applicant: Lumentum Operations LLC, San Jose, CA (US)

(72) Inventor: Ali Salehiomran, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 959 days.

(21) Appl. No.: 17/804,228

(22) Filed: May 26, 2022

(65) Prior Publication Data

US 2023/0361522 A1 Nov. 9, 2023

Related U.S. Application Data

(60) Provisional application No. 63/364,046, filed on May 3, 2022.

(51) Int. Cl.
| | |
|---|---|
| *H01S 3/00* | (2006.01) |
| *H01S 3/067* | (2006.01) |
| *H01S 3/16* | (2006.01) |
| *H01S 3/23* | (2006.01) |

(52) U.S. Cl.
CPC ........ *H01S 3/06716* (2013.01); *H01S 3/1608* (2013.01); *H01S 3/1618* (2013.01); *H01S 3/2308* (2013.01)

(58) Field of Classification Search
CPC .. H01S 3/06716; H01S 3/1608; H01S 3/1618; H01S 3/2308
See application file for complete search history.

(56) References Cited

U.S. PATENT DOCUMENTS

| | | | |
|---|---|---|---|
| 8,699,125 B2 | 4/2014 | Bolshtyansky et al. | |
| 2002/0071173 A1* | 6/2002 | Lee ........................ | H01S 3/1301 |
| | | | 359/337.1 |
| 2012/0321319 A1* | 12/2012 | Jiang ................... | H04B 10/0793 |
| | | | 398/79 |
| 2018/0233875 A1* | 8/2018 | Jollivet ............. | H01S 3/094007 |
| 2021/0396931 A1* | 12/2021 | Harker ................... | G02B 6/255 |

FOREIGN PATENT DOCUMENTS

| | | | | | |
|---|---|---|---|---|---|
| CA | 2280962 A1 | * | 8/1998 | .......... | H04B 10/291 |
| KR | 20200143092 | * | 12/2020 | .......... | G02B 6/2746 |
| WO | WO 2008135965 A1 | * | 11/2008 | .......... | H04B 10/294 |

* cited by examiner

*Primary Examiner* — Mark Hellner
(74) *Attorney, Agent, or Firm* — Harrity & Harrity, LLP

(57) ABSTRACT

In some implementations, an optical amplifier system includes a variable gain optical amplifier that is an erbium doped fiber amplifier. The variable gain optical amplifier may provide a first gain stage for an optical signal. The optical amplifier system may include a fixed gain optical amplifier that is an erbium-ytterbium doped fiber amplifier. The fixed gain optical amplifier may provide a second gain stage for the optical signal following the first gain stage.

20 Claims, 5 Drawing Sheets

100

200

500

510 Obtain an optical signal

520 Amplify, in a first gain stage, the optical signal using a variable gain optical amplifier that is an EDFA 530 Amplify, in a second gain stage, the optical signal using a fixed gain optical amplifier that is an EYDFA

FULL-BAND, HIGH-POWER OPTICAL AMPLIFIER

CROSS-REFERENCE TO RELATED APPLICATION

This Patent application claims priority to U.S. Provisional Patent Application No. 63/364,046, filed on May 3, 2022, and entitled "FULL-BAND, HIGH-POWER AMPLIFIER FOR OPTICAL COMMUNICATION." The disclosure of the prior Application is considered part of and is incorporated by reference into this Patent Application.

TECHNICAL FIELD

The present disclosure relates generally to optical amplifiers and to a full-band, high-power optical amplifier.

BACKGROUND

An optical amplifier is a device that is to receive signal light and generate amplified signal light (i.e., signal light with comparatively higher optical power). Typically, the optical amplifier provides optical amplification using a so-called gain medium, which is "pumped" (i.e., provided with energy) by a source, such as a pump laser. In some cases, the optical amplifier may utilize an optical fiber as a gain medium (such a device may be referred to as a fiber amplifier). In such a case, the gain medium may be a glass fiber doped with rare earth ions, such as erbium, neodymium, ytterbium, praseodymium, thulium, or the like. Such a fiber may be referred to as an active fiber. In operation, the signal light propagates through the active fiber together with pump light, and the active fiber outputs the amplified signal light that is generated from the signal light and the pump light. Generally, such optical amplifiers include other discrete components associated with controlling, enabling, and/or monitoring optical amplification. Such discrete components may include, for example, one or more isolators, a combiner (e.g., a wavelength division multiplexer (WDM)), a tunable filter, a variable optical attenuator (VOA), a gain-flattening filter (GFF), a tap, a photo diode, or the like.

SUMMARY

In some implementations, an optical amplifier system includes a variable gain optical amplifier that is an erbium doped fiber amplifier (EDFA), a gain flattening filter at an output of the variable gain optical amplifier, and a fixed gain optical amplifier that is an erbium-ytterbium doped fiber amplifier (EYDFA), the fixed gain optical amplifier at an output of the gain flattening filter.

In some implementations, an optical amplifier system includes a variable gain optical amplifier that is an EDFA, the variable gain optical amplifier to provide a first gain stage for an optical signal, and a fixed gain optical amplifier that is an EYDFA, the fixed gain optical amplifier to provide a second gain stage for the optical signal following the first gain stage.

In some implementations, a method includes obtaining, by an optical amplifier system, an optical signal; amplifying, by the optical amplifier system in a first gain stage, the optical signal using a variable gain optical amplifier that is an EDFA; and amplifying, by the optical amplifier system in a second gain stage, the optical signal using a fixed gain optical amplifier that is an EYDFA.

DETAILED DESCRIPTION

Figure 1:
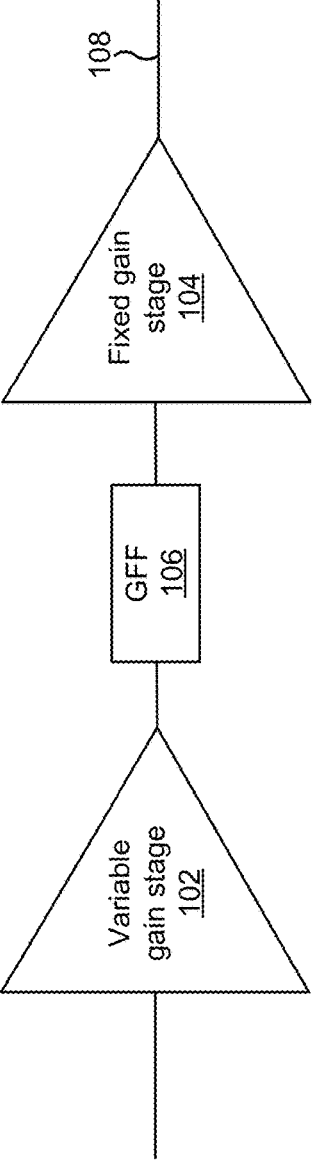
FIG. 1 shows an example optical amplifier system described herein.

The following detailed description of example implementations refers to the accompanying drawings. The same reference numbers in different drawings may identify the same or similar elements.

Many telecommunication applications have emerged for high power optical amplifiers. Current applications include free space communication between satellites that use tens of watts of optical power, and low earth orbit (LEO) to ground communication at high rates that may use even higher optical power. In addition, hollow core fiber (HCF) may have propagation losses as low as 0.28 decibels (dB) per kilometer (km) over the C- and L-bands. With a non-linear coefficient that is 1000 times lower than standard single-mode fiber (SSMF), HCF could enable higher spectral efficiency and therefore higher capacity per fiber for terrestrial and submarine networks and could also facilitate multi-band transmission in the O-, S-, C- and L-bands.

To take advantage of the capabilities of HCF, optical amplifiers that can launch significantly higher power into the fiber are needed, such as erbium-ytterbium doped fiber amplifiers (EYDFAs) using cladding pumping. Some approaches for EYDFAs attempt to achieve a large gain (e.g., greater than 20 dBs) from erbium-ytterbium doped fiber (EYDF) of the EYDFAs. Because gain roll-off at the edges of some optical bands (e.g., the C-band) may be sharp for EYDFs, this large gain results in a significant gain imbalance between the edges and a peak gain value. However, optical amplifiers used in optical telecommunication networks should operate in a gain flattened mode, where gain is flat as a function of wavelength over an operating band. Here, a gain flattening filter (GFF) used to flatten the gain of EYDFAs may need to be excessively deep (e.g., greater than 20 dB peak loss), which leads to low power efficiency, increased noise figure, and increased ripple.

Commonly, optical amplifiers should cover a gain range rather than having a fixed gain. That is, the gain of the amplifier or a stage of the amplifier may be adjusted during use rather than operating at a predetermined specific (i.e., fixed) gain value. This can be achievable for erbium doped fiber amplifiers (EDFAs) because a target shape for the GFF is not a strong function of the gain of the erbium doped fiber (EDF). However, for EYDFAs, a target shape of the GFF is dependent on the gain of the EYDF, such that covering a gain range is difficult because the target shape of the GFF is changing as a function of the EYDF gain.

Thus, an active fiber that is co-doped with erbium and ytterbium has a reduced achievable gain bandwidth, thereby limiting the number of active dense wavelength division multiplexing (DWDM) channels, and the active fiber may be unable to provide gain variability. Accordingly, EYDFAs may provide high power amplification only partially across an optical band (e.g., about 1535 to 1560 nanometers (nm) in the case of the C-band, which has a full bandwidth of about 1528 nm to about 1567 nm). However, for an optical telecommunication network, high-power amplification across the entirety of a wavelength range used for the optical telecommunication network is needed.

Some implementations described herein provide a high-power optical amplifier that can provide gain over the entirety of a wavelength range used for an optical telecommunication network. For example, a gain bandwidth of the optical amplifier may encompass the C-band (e.g., about 1528 nm to about 1567 nm) or the L-band (e.g., about 1570 nm to about 1620 nm), among other examples, used for optical communication. In some implementations, the optical amplifier may include a variable gain stage that includes an EDFA and a fixed gain stage that includes an EYDFA. Accordingly, the optical amplifier may provide variable gain (e.g., the optical amplifier is an EYDFA-based optical amplifier with variable gain). In some implementations, the EDFA may provide an amount of optical gain that is greater than an amount of optical gain provided by the EYDFA. By reducing the gain provided by the EYDFA, a gain imbalance may be reduced between the edges and a peak gain value of an optical band. In this way, the optical amplifier may provide high optical gain over an increased gain bandwidth. Furthermore, by reducing the gain imbalance, a GFF used for the optical amplifier may be less deep, thereby improving power efficiency, noise figure, and ripple.

FIG. 1 shows an example optical amplifier system 100. As shown, the optical amplifier system 100 includes a first gain stage that is a variable gain stage that includes a variable gain optical amplifier 102 and a second gain stage that is a fixed gain stage that includes a fixed gain optical amplifier 104 (e.g., the optical amplifier system 100 includes a multi-stage amplifier). The variable gain stage (e.g., a pre-amplification stage) may obtain an optical signal (e.g., signal light) that is to be amplified. The fixed gain stage may output the amplified optical signal. In some implementations, an input power to the optical amplifier system 100 may be –20 dB milliwatts (dBm) to +20 dBm. In some implementations, a gain of the optical amplifier system 100 may be in a range from 20 dB to 40 dB.

The gain level of the variable gain optical amplifier 102 may be configured to a particular value (e.g., the particular value may be based on a desired gain of the optical amplifier system 100). In some implementations, the variable gain optical amplifier 102 may include a rare-earth doped fiber amplifier other than a ytterbium doped fiber amplifier. For example, the variable gain optical amplifier 102 may include an EDFA. The variable gain optical amplifier 102 may provide optical gain in a range from 10 to 30 dB.

In contrast to the variable gain optical amplifier 102, the gain level of the fixed gain optical amplifier 104 may be at a fixed value. That is, for a particular optical amplifier system 100, the fixed gain optical amplifier 104 (i.e., the fixed gain stage) may have a specific fixed gain that is determined prior to deploying the optical amplifier system 100. For other optical amplifier systems 100, the fixed gain optical amplifier 104 (i.e., the fixed gain stage) may have other predetermined fixed gain values that are determined prior to deploying the other optical amplifier systems 100. The fixed gain optical amplifier 104 may include a ytterbium rare-earth co-doped fiber amplifier. For example, the fixed gain optical amplifier 104 may include an EYDFA. The fixed gain optical amplifier 104 may provide optical gain that is equal to or less than 20 dB. For example, the fixed gain optical amplifier 104 may provide optical gain in a range from 5 to 15 dB. In some implementations, the optical gain of the fixed gain optical amplifier 104 may be less than the optical gain of the variable gain optical amplifier 102. By limiting and fixing (i.e., specifying and/or predetermining) the amount of gain provided by the fixed gain optical amplifier 104, bandwidth reduction typically associated with EYDFAs can be eliminated and gain ripple at an output of the optical amplifier system 100 can be limited. For example, a gain ripple of the optical amplifier system 100 may be less than or equal to 2 dB, or within a range from 1 dB to 1.5 dB. "Gain ripple" may refer to a difference between a maximum output power and a minimum output power across a gain bandwidth of the optical amplifier system 100.

The optical amplifier system 100 may include a GFF 106. The GFF 106 may be located at an output of the variable gain optical amplifier 102. That is, the GFF 106 may be located between the output of the variable gain optical amplifier 102 and an input of the fixed gain optical amplifier 104. The variable gain optical amplifier 102 may be connected to the GFF 106 by a first optical fiber, and the fixed gain optical amplifier 104 may be connected to the GFF by a second optical fiber. The GFF 106 may be configured to process an optical signal output from the variable gain optical amplifier 102 (e.g., to provide gain flattening).

In some implementations, a target shape of the GFF 106 (e.g., the power loss provided by the GFF 106 over a range of wavelengths) is based on (e.g., is a function of) the gain provided by the fixed gain optical amplifier 104. In some implementations, a depth of the GFF 106 (e.g., a maximum power loss provided by the GFF 106) is less than or equal to 15 dB, or about 10 dB. Reducing GFF depth reduces noise figure penalty and helps to reduce gain ripple by reducing a GFF error function. A GFF error function is a deviation of a GFF from a target shape as a function of wavelength due to manufacturing irregularities. The GFF error function increases as a function of GFF depth.

The optical amplifier system 100 may include an output fiber 108. In some implementations, the output fiber 108 is a hollow core fiber. The output fiber 108 may be connected to the output of the fixed gain optical amplifier 104.

In some implementations, a gain bandwidth of the optical amplifier system 100 is equal to or greater than 35 nm, equal to or greater than 60 nm, or equal to or greater than 70 nm. In some implementations, a gain bandwidth of the optical amplifier system 100 encompasses a wavelength range used in an optical telecommunication network. For example, a gain bandwidth of the optical amplifier system 100 may encompass the entire C-band (or "conventional band") for optical communication. As an example, a gain bandwidth of the optical amplifier system 100 may encompass a range from 1528 nm to 1567 nm. In some implementations, a gain bandwidth of the optical amplifier system 100 encompasses the entire L-band (or "long-wavelength band") for optical communication. For example, a gain bandwidth of the optical amplifier system 100 may encompass 1570 nm to 1620 nm. In some implementations, the optical amplifier system 100 may provide an output power across the gain bandwidth that deviates (e.g., gain ripple) by less than 2 dB or less than 1 dB. In other words, output powers associated with any two wavelengths in the gain bandwidth of the optical amplifier system 100 may deviate from each other by less than 2 dB or less than 1 dB. In some implementations, a gain range of the optical amplifier system is greater than or equal to 5 dB. A gain bandwidth of the optical amplifier system 100 may include wavelengths that experience a gain from the optical amplifier system 100 that is within a particular range (±3 dB) of an average gain over a wavelength range.

In this way, the gain of the fixed gain optical amplifier 104 is constant to enable a target shape for the GFF 106 to remain the same. For example, if the gain of the fixed gain optical amplifier can change, then the GFF 106 will not be able to flatten the optical amplifier system 100, and deviation from an initial target shape for the GFF 106 will be ripple penalty. Accordingly, gain from the fixed gain optical amplifier is the same over the entire gain range that the optical amplifier system 100 covers. Moreover, as described above, the gain of the fixed gain optical amplifier 104 is limited to improve gain bandwidth using a reasonable depth for the GFF 106. As described above, another optical amplifier system 100, with a different fixed gain optical amplifier 104 having a different amount of fixed (i.e., predetermined) gain may be paired with a different GFF 106.

In some implementations, the variable gain optical amplifier 102 is in a switchable gain configuration with at least one other variable gain optical amplifier (e.g., that is similar to the variable gain optical amplifier 102, but that provides a different gain profile). For example, the variable gain stage may include multiple, switchable variable gain optical amplifiers. Additionally, or alternatively, the fixed gain optical amplifier 104 may be in a switchable gain configuration with at least one other fixed gain optical amplifier (e.g., that is similar to the fixed gain optical amplifier 104, but that provides a different gain profile). For example, the fixed gain stage may include multiple, switchable fixed gain optical amplifiers. Each of the switchable fixed gain optical amplifiers may be paired with a different GFF 106. A "switchable gain configuration" may refer to a configuration in which two or more amplifiers share most of an optical path, and an optical switch adds or removes a gain stage by selecting one of the amplifiers. In some implementations, the variable gain stage may include multiple (e.g., cascaded) variable gain optical amplifiers, as described herein. Additionally, or alternatively, the fixed gain stage may include multiple (e.g., cascaded) fixed gain optical amplifiers, as described herein.

As indicated above, FIG. 1 is provided as an example. Other examples may differ from what is described with regard to FIG. 1.

Figure 2:
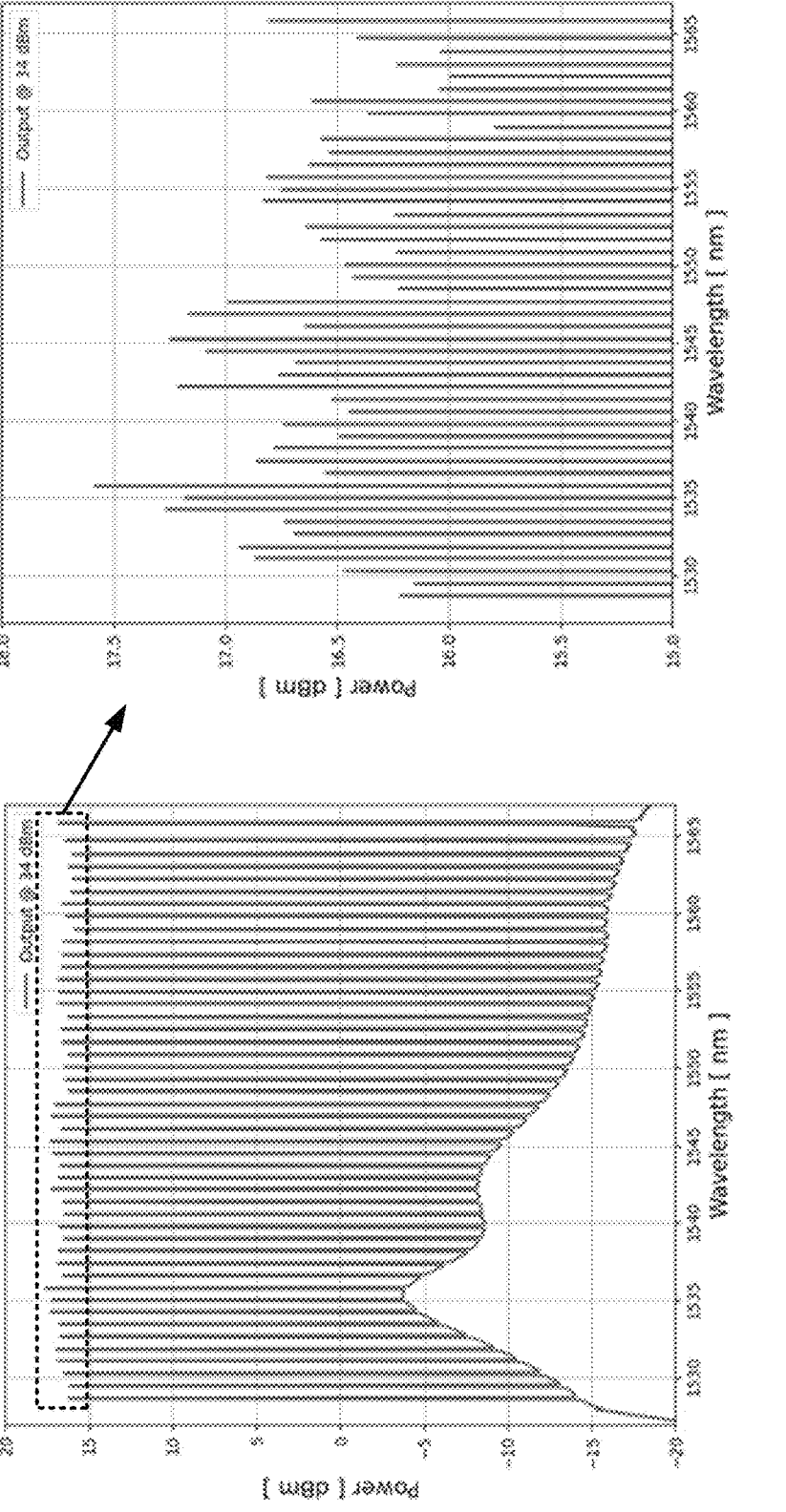
FIG. 2 shows a graph of an example output spectrum of the optical amplifier system of FIG. 1.

FIG. 2 shows graphs 200 of an example output spectrum of the optical amplifier system 100. As shown in FIG. 2, the optical amplifier system 100 may have a gain bandwidth from 1528 nm to 1567 nm. As further shown in FIG. 2, ripple across the gain bandwidth may be minimal.

As indicated above, FIG. 2 is provided as an example. Other examples may differ from what is described with regard to FIG. 2.

Figure 3:
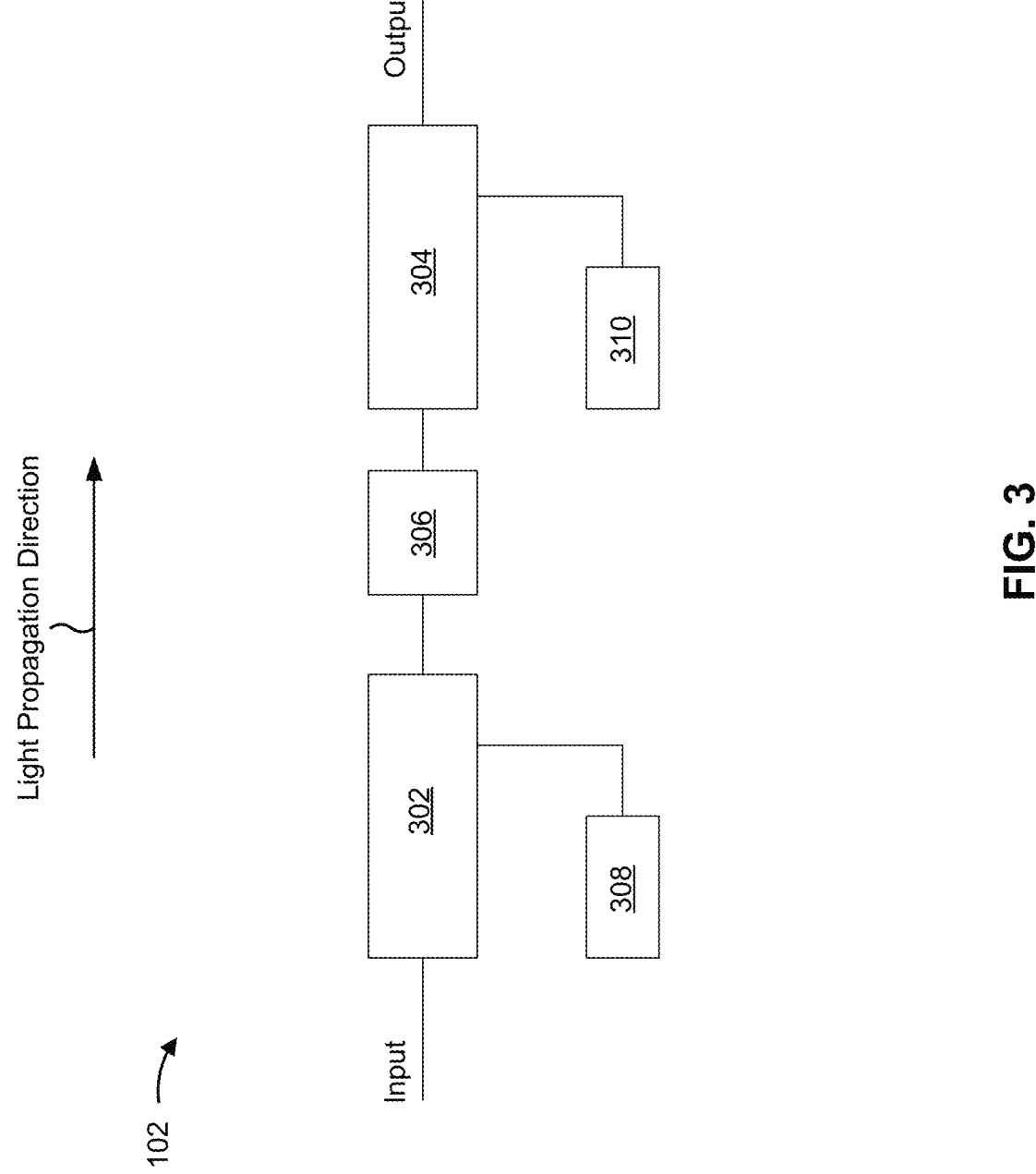
FIG. 3 shows an example variable gain optical amplifier described herein.

FIG. 3 shows an example variable gain optical amplifier 102. As described above, the variable gain optical amplifier 102 may include an EDFA. The variable gain optical amplifier 102 may include a first gain stage 302 that includes one or more first active fibers (e.g., EDFs) and a second gain stage 304 that includes one or more second active fibers (e.g., EDFs). The variable gain optical amplifier 102 may include a variable optical attenuator 306 between the first gain stage 302 and the second gain stage 304. For example, the variable optical attenuator 306 may connect an output of the first gain stage 302 and an input of the second gain stage 304.

The variable gain optical amplifier 102 may also include an optical source 308 (e.g., a pump source) to provide pump light to the EDF of the first gain stage 302, and an optical source 310 (e.g., a pump source) to provide pump light to the EDF of the second gain stage 304. The optical source 308 and/or the optical source 310 may include a laser. In some implementations, the optical source 308 may be configured to provide core pumping of the EDF of the first gain stage and/or the optical source 310 may be configured to provide core pumping of the EDF of the second gain stage. In some implementations, the variable gain optical amplifier 102 may include multiple optical sources 308 and/or multiple optical sources 310.

As indicated above, FIG. 3 is provided as an example. Other examples may differ from what is described with regard to FIG. 3. In some implementations, the variable gain optical amplifier 102 may have a different configuration from that shown in FIG. 3 and/or may include components not shown in FIG. 3.

Figure 4:
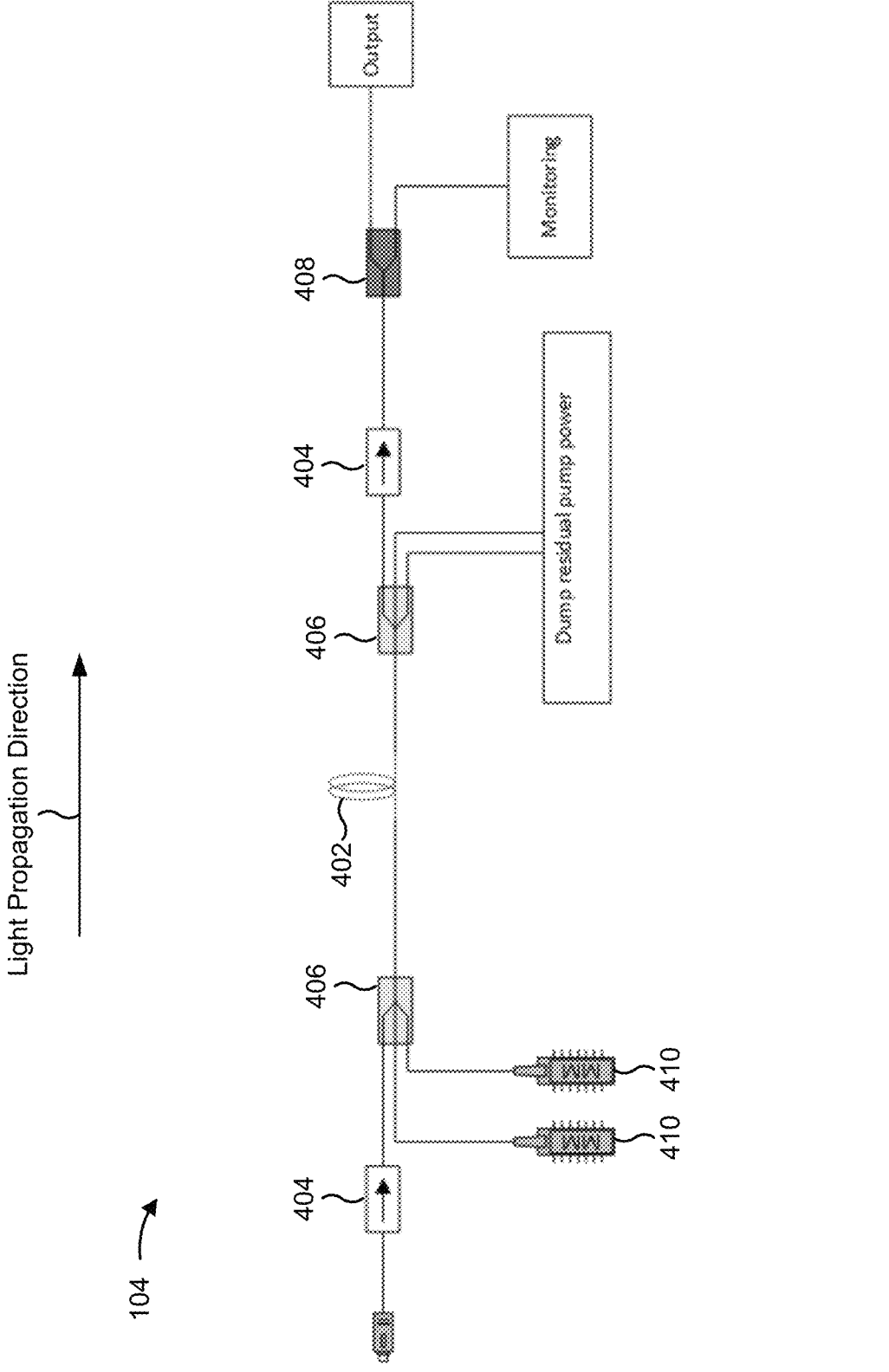
FIG. 4 shows an example fixed gain optical amplifier described herein.

FIG. 4 shows an example fixed gain optical amplifier 104. As described above, the fixed gain optical amplifier 104 may include an EYDFA, and the EYDFA may include an active fiber that is an EYDF 402. The EYDF 402 may have a length from 0.5 meters (m) to 10 m, 20 m, 30 m, or more, based on the gain that is desired and operating wavelengths. As shown, the fixed gain optical amplifier 104 may include one or more isolators 404, one or more WDMs 406, and/or one or more taps 408, among other examples.

The fixed gain optical amplifier 104 may also include at least one optical source 410 (e.g., a pump source) to provide pump light to the EYDF 402. For example, the optical source 410 may include a laser. The optical source 410 may be a multi-mode optical source. In some implementations, the optical source 410 may be configured to provide cladding pumping of the EYDF 402. Additionally, or alternatively, the optical source 410 may be configured to provide core pumping of the EYDF 402. In some implementations, the fixed gain optical amplifier 104 may include multiple optical sources 410. For example, the fixed gain optical amplifier 104 may include 50 optical sources 410 to achieve 100 watts (W) of output power. A WDM 406 after the EYDF 402, in a light propagation direction, may be a splitter to dump residual pump power.

As indicated above, FIG. 4 is provided as an example. Other examples may differ from what is described with regard to FIG. 4. In some implementations, the fixed gain optical amplifier 104 may have a different configuration from that shown in FIG. 4 and/or may include components not shown in FIG. 4.

Figure 5:
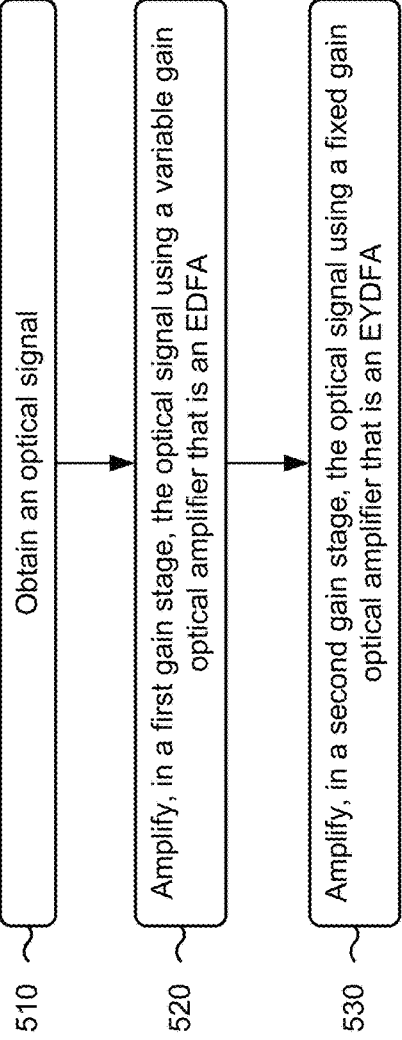
FIG. 5 is a flowchart of an example process relating to full-band, high-power optical amplification.

FIG. 5 is a flowchart of an example process 500 associated with full-band, high-power optical amplification. In some implementations, one or more process blocks of FIG. 5 are performed by an optical amplifier system (e.g., optical amplifier system 100).

As shown in FIG. 5, process 500 may include obtaining an optical signal (block 510). For example, the optical amplifier system may obtain an optical signal, as described above.

As further shown in FIG. 5, process 500 may include amplifying the optical signal using a variable gain optical amplifier that is an EDFA (block 520). For example, the optical amplifier system may amplify the optical signal using a variable gain optical amplifier that is an EDFA, as described above.

As further shown in FIG. 5, process 500 may include amplifying the optical signal using a fixed gain optical amplifier that is an EYDFA (block 530). For example, the optical amplifier system may amplify the optical signal using a fixed gain optical amplifier that is an EYDFA, as described above.

Process 500 may include additional implementations, such as any single implementation or any combination of implementations described below and/or in connection with one or more other processes described elsewhere herein.

In a first implementation, process 500 includes processing the optical signal output from the variable gain optical amplifier with a gain flattening filter having a depth that is less than or equal to 15 decibels.

In a second implementation, alone or in combination with the first implementation, a gain bandwidth of the optical amplifier system encompasses a range from 1528 nanometers to 1567 nanometers or 1570 nanometers to 1620 nanometers.

In a third implementation, alone or in combination with one or more of the first and second implementations, amplifying the optical signal using the variable gain optical amplifier and amplifying the optical signal using the fixed gain optical amplifier provides an output power having a deviation that is less than 2 decibels across a gain bandwidth of the optical amplifier system.

In a fourth implementation, alone or in combination with one or more of the first through third implementations, amplifying the optical signal using the variable gain optical amplifier provides optical gain in a range from 10 to 30 decibels, and amplifying the optical signal using the fixed gain optical amplifier provides optical gain in a range from 5 to 15 decibels.

Although FIG. 5 shows example blocks of process 500, in some implementations, process 500 includes additional blocks, fewer blocks, or different blocks than those depicted in FIG. 5.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical amplifier system, comprising:
a variable gain optical amplifier that is an erbium doped fiber amplifier (EDFA);
a gain flattening filter at an output of the variable gain optical amplifier; and
a fixed gain optical amplifier that is an erbium-ytterbium doped fiber amplifier (EYDFA),
    wherein the fixed gain optical amplifier is at an output of the gain flattening filter, and
    wherein an optical gain provided by the fixed gain optical amplifier being less than an optical gain provided by the variable gain optical amplifier reduces gain ripple of the optical amplifier system.

2. The optical amplifier system of claim 1, further comprising:
a hollow core fiber at an output of the fixed gain optical amplifier.

3. The optical amplifier system of claim 1,
wherein a gain bandwidth of the optical amplifier system encompasses a range from 1528 nanometers to 1567 nanometers or 1570 nanometers to 1620 nanometers.

4. The optical amplifier system of claim 3,
wherein the optical amplifier system is configured to provide an output power having a deviation that is less than 2 decibels across the gain bandwidth.

5. The optical amplifier system of claim 1,
wherein the variable gain optical amplifier provides optical gain in a range from 10 to 30 decibels and the fixed gain optical amplifier provides optical gain in a range from 5 to 15 decibels.

6. The optical amplifier system of claim 1,
wherein a depth of the gain flattening filter is less than or equal to 15 decibels.

7. The optical amplifier system of claim 1, wherein at least one of:
the variable gain optical amplifier is in a switchable gain configuration with at least one other variable gain optical amplifier, or
the fixed gain optical amplifier is in a switchable gain configuration with at least one other fixed gain optical amplifier.

8. An optical amplifier system, comprising:
a variable gain optical amplifier that is an erbium doped fiber amplifier (EDFA), the variable gain optical amplifier to provide a first gain stage for an optical signal; and
a fixed gain optical amplifier that is an erbium-ytterbium doped fiber amplifier (EYDFA), the fixed gain optical amplifier to provide a second gain stage for the optical signal following the first gain stage,
    wherein an optical gain of the fixed gain optical amplifier being less than an optical gain of the variable gain optical amplifier reduces gain ripple of the optical amplifier system.

9. The optical amplifier system of claim 8,
wherein the variable gain optical amplifier comprises at least one first optical source to provide pump light, and

wherein the fixed gain optical amplifier comprises at least one second optical source to provide pump light.

10. The optical amplifier system of claim 9, wherein the at least one second optical source is configured to provide cladding pumping of an active fiber of the EYDFA.

11. The optical amplifier system of claim 8, further comprising:

a gain flattening filter between the variable gain optical amplifier and the fixed gain optical amplifier.

12. The optical amplifier system of claim 8, wherein a gain bandwidth of the optical amplifier system encompasses a range from 1528 nanometers to 1567 nanometers or 1570 nanometers to 1620 nanometers.

13. The optical amplifier system of claim 12, wherein the optical amplifier system is configured to provide an output power having a deviation that is less than 2 decibels across the gain bandwidth.

14. A method, comprising:

obtaining, by an optical amplifier system, an optical signal;

amplifying, by the optical amplifier system in a first gain stage, the optical signal using a variable gain optical amplifier that is an erbium doped fiber amplifier (EDFA); and amplifying, by the optical amplifier system in a second gain stage, the optical signal using a fixed gain optical amplifier that is an erbium-ytterbium doped fiber amplifier (EYDFA), wherein an optical gain of the fixed gain optical amplifier being less than an optical gain of the variable gain optical amplifier reduces gain ripple of the optical amplifier system.

15. The method of claim 14, further comprising:

processing the optical signal output from the variable gain optical amplifier with a gain flattening filter having a depth that is less than or equal to 15 decibels.

16. The method of claim 14, wherein a gain bandwidth of the optical amplifier system encompasses a range from 1528 nanometers to 1567 nanometers or 1570 nanometers to 1620 nanometers.

17. The method of claim 16, wherein amplifying the optical signal using the variable gain optical amplifier and amplifying the optical signal using the fixed gain optical amplifier provides an output power having a deviation that is less than 2 decibels across the gain bandwidth.

18. The method of claim 14, wherein amplifying the optical signal using the variable gain optical amplifier provides optical gain in a range from 10 to 30 decibels, and wherein amplifying the optical signal using the fixed gain optical amplifier provides optical gain in a range from 5 to 15 decibels.

19. The optical amplifier system of claim 11, wherein a depth of the gain flattening filter is less than or equal to 15 decibels.

20. The optical amplifier system of claim 1, wherein the gain ripple of the optical amplifier system is no more than 2 decibels.

* * * * *